Re. 24440
March 5, 1957      W. GROEN      2,784,013
HYDRAULIC SEAL
Filed Dec. 21, 1953
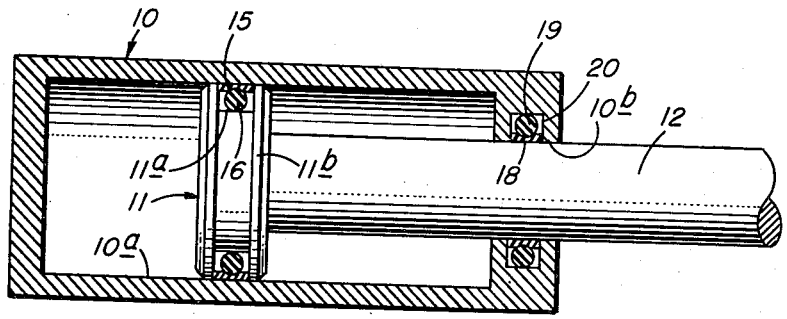
Fig. 1
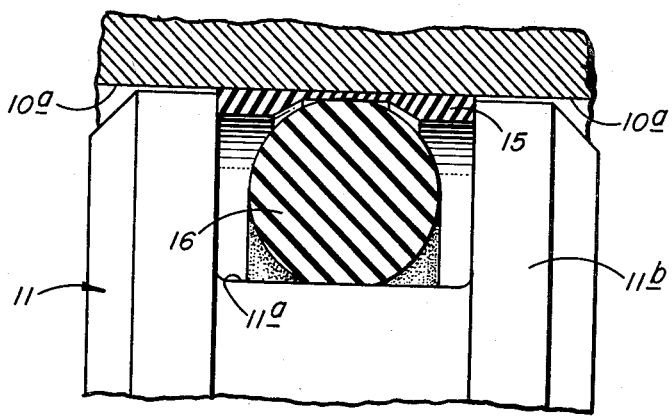
Fig. 2
INVENTOR.
William Groen
BY 
ATTORNEY

United States Patent Office 2,784,013
Patented Mar. 5, 1957

2,784,013

HYDRAULIC SEAL

William Groen, Northridge, Calif., assignor to Bendix Aviation Corporation, North Hollywood, Calif., a corporation of Delaware Application December 21, 1953, Serial No. 399,550

1 Claim. (Cl. 286—26)

This invention relates to fluid seals between relatively reciprocable members such as pistons and cylinders and piston rods and cylinder heads, as examples, and for relatively rotating members such as shafts in housings. It is particularly adapted for hydraulic and pneumatic systems.

An object of the invention is to provide a seal that remains fluid-tight over a wide range of temperatures and despite long idle periods.

Another object is to provide a seal having low friction and high resistance to abrasion with resultant long life.

Other more specific objects and features of the invention will appear from the description to follow.

The type of seal most commonly used in hydraulic apparatus at present is a rubber O ring positioned in an annular groove in one of the relatively reciprocating surfaces and slightly compressed against the other surface. Such seals are simple and inexpensive, but require lubrication to have good life. Such lubrication is provided by the hydraulic fluid under conditions of service which permit slight leakage past the ring. Where rubber O rings run dry, they abrade rapidly and have a short life, even with the best rubber materials available. Furthermore, the rubber materials that have the requisite strength and abrasion resistance properties are effective only within a limited temperature range. At temperatures above 150° F. or 200° F. they deteriorate rapidly in storage, and if exposed to such temperatures while installed but in idle condition for long lengths of time, they frequently weld to the juxtaposed friction surface and tear when movement is resumed.

There is now available a relatively new material, polytetrafluoroethylene resin, a plastic material commonly known under the trade name of "Teflon." It has the unusual characteristic of transferring to a metal against which it rubs in the form of a thin film and becomes self-lubricating with very low friction and long life. It retains its good bearing characteristics over a wide range of temperatures (from —100° F. to +500° F.). For these reasons, "Teflon" has been used in O rings with success under suitable conditions. However, "Teflon" O rings have definite limitations as compared to rubber O rings, although having certain advantages thereover.

The most serious limitations are:

(1) They lack sufficient elasticity to be stretched over a piston and are adapted only for two-piece structures which can be disassembled to permit installation of the ring in the groove.

(2) They are relatively stiff, and, although capable of being distorted by force, they restore to their original shape only slowly after the distorting force is removed, whereby they tend to leak at low fluid pressures.

The present invention utilizes the desirable properties of "Teflon" in a seal and overcomes its limitations by employing a radially thin "Teflon" ring or band (constituting the bearing member) in the top portion of the groove backed by a rubber O ring which is compressed between the "Teflon" ring and the bottom of the groove. Because of its radial thinness, the "Teflon" ring can be stretched sufficiently to permit installation in the groove. Furthermore, its thinness makes it sufficiently yieldable to be urged into contact with the working surface by the force of the compressed O ring therebeneath, so that the "Teflon" ring itself need not supply the resilient force necessary to seal at low pressures. Of course, at high pressures the fluid pressure against the rear face of the "Teflon" ring provides the necessary high sealing force.

Because the O ring does not frictionally engage a moving surface, it need not have abrasion-resisting properties and can be made of a special elastomer, such as silicone rubber, which retains its desired properties over a very wide temperature range, but would not be suitable for directly sealing against a moving surface. Since "Teflon" itself retains its physical characteristics over a very wide temperature range, the combination provides an effective seal utilizing the inherent advantages of both a "Teflon" ring and a rubber ring, while eliminating the serious defects of both.

A full understanding of the invention may be had from the following detailed description with reference to the drawing, in which:

Fig. 1 is a longitudinal section through a cylinder assembly having piston and piston rod seals in accordance with the invention, and Fig. 2 is a portion of Fig. 1 drawn to a larger scale to better show the relative dimensions of the parts.

Referring to Fig. 1, there is shown a simple cylinder 10 containing a piston 11 connected to a piston rod 12 which extends through an aperture in one end of the cylinder 10.

A seal is effected between the piston 11 and the wall 10a of the cylinder 10 by a "Teflon" band or ring 15 and a rubber O ring 16 positioned in an annular groove 11a in the peripheral wall 11b of the piston 11. A seal is effected between the piston rod 12 and the end or head of the cylinder 10 by a "Teflon" ring 18 and a rubber O ring 19 positioned in a groove 20 in the bearing surface 10b which engages the piston rod 12. The only essential difference between the seal for the piston and the seal for the piston rod is that in the former the groove is in an external surface, and the "Teflon" ring is in the radially outer portion of the groove, whereas in the piston rod seal the groove is in an external cylindrical surface, and the "Teflon" ring is positioned in the radially inner portion of the groove. Obviously, this is simply a reversal of parts. In each case, the "Teflon" ring is at the opening of the groove, and the O ring is therebehind.

Referring to Fig. 2, the "Teflon" ring 15 is actually quite thin, although thick relative to the clearance between the piston and cylinder, and it is much thinner radially than the O ring 16 therebelow. The "Teflon" ring 15 is preferably made thicker at the edges than at the center to provide ample area of contact between the edges of the "Teflon" ring and the sidewalls of the groove, as compared to the unsupported area at the edges of the ring which fill the clearance between the piston and cylinder while, at the same time, permitting a small average thickness. Since there is little difference between the external and internal diameters of the "Teflon" ring, it is possible to stretch it over the piston for installation in the groove, despite the limited elasticity of "Teflon."

As shown in Fig. 2, the O ring 16 is always slightly compressed between the bottom wall of the groove and the rear face of the "Teflon" ring, so that it is distorted from its normal circular cross-sectional shape and constantly exerts an outward force on the "Teflon" ring sufficient to maintain it in sealing engagement with the cylinder wall 10a, even when there is no appreciable fluid pressure differential across the piston. Under such circumstances, the ring 15 may bulge slightly because of its thin midsection, so that a close contact with the cylinder wall exists only at the center. However, this is sufficient to prevent leakage at low pressures.

In response to any appreciable differential fluid pressure across the piston, a fluid pressure is developed between the high pressure wall of the groove and the O ring 16, which compresses the latter against the opposite wall of the groove and forms a tight fluid seal against any leakage across the groove back of the "Teflon" ring 15. At the same time, the high fluid pressure is applied against the whole under side of the "Teflon" ring, in part directly and in part by pressure transference through the O ring 16. This produces a sealing force between the "Teflon" ring and the cylinder wall 10a that is substantially directly proportional to the pressure differential and prevents leakage at all pressures of any magnitude.

For purposes of example only, the "Teflon" ring 15 may have a radial thickness at the center from .005 to .010 inch and of about .030 of an inch at the edges, in a ring having a diameter of approximately 1.4 inches. In the case of larger diameter rings, the wall thickness may be increased, and for rings of less diameter, it may desirably be decreased.

The optimum thickness at the edges depends upon the magnitude of the clearance that is to be sealed. Generally the radial overlap between the "Teflon" ring and the sidewall of the groove should be greater than the clearance, and preferably several times greater. Larger clearances can be used than are permissible with simple O ring seals.

The foregoing description of the piston seal applies to the piston rod seal, except for the obvious reversal of the parts.

The seal construction described for use between relatively reciprocable surfaces is equally effective between relatively rotatable surfaces. The friction between the groove, O ring and "Teflon" ring is much greater than that between the "Teflon" ring and the surface against which it seals, so that there is no slippage of the O ring and the "Teflon" ring circumferentially in the groove, and the O ring has a long life. O rings alone are subject to severe stresses in rotary service and frequently fail.

The outer ring has been described throughout as being made of "Teflon," for convenience and because that is the presently known most suitable material. It has also been mentioned that for operation over a wide frequency range, the O ring is preferably made of an elastomer having uniform physical characteristics over a wide temperature range, such as a silicone rubber. However, it will be obvious to those skilled in the art that other materials than those specifically mentioned may be advantageously employed in utilizing the invention, the essential requirements being that the outer or bearing ring have the requisite strength and frictional characteristics to seal and have a long life, whereas the O ring need only have the necessary resilience or expansive force over the operating range.

Although for the purpose of explaining the invention a particular embodiment thereof has been shown and described, obvious modifications will occur to a person skilled in the art, and I do not desire to be limited to the exact details shown and described.

I claim:

A fluid seal for sealing between two relatively movable members having slidably fitted complementary cylindrical working surfaces, one of which contains an annular groove juxtaposed to the other working surface, said seal comprising: a circumferentially continuous sealing ring of width to slidably fit in said groove and having a cylindrical working face complementary to and of substantially the same diameter as the other of said working surfaces; a circumferentially continuous deformable O ring positioned back of the sealing ring; the combined radial thickness of the sealing ring and the O ring when the latter is in its free state being greater than the radial depth of the groove, and the sealing ring being of substantially stiffer material than the O ring whereby the O ring is radially compressed between the bottom of the groove and the sealing ring when the seal is installed in the groove; the sealing ring having maximum radial thickness at its edges and having an intermediate zone of substantial width and uniform radial thickness substantially less than said edge thickness.

References Cited in the file of this patent

UNITED STATES PATENTS

| 2,025,299 | Mitchell | Dec. 24, 1935 |
| 2,567,527 | Parks | Sept. 11, 1951 |
| 2,625,413 | Christensen | Jan. 13, 1953 |

FOREIGN PATENTS

| 520,237 | Great Britain | Apr. 18, 1940 |
| 1,049,256 | France | Aug. 19, 1953 |

OTHER REFERENCES

"Silicone Rubber" (Irish and Stirrat), published in Product Engineering, February 1947, pages 146–150 relied upon. (Copy in Scientific Library and Div. 52.)